(12) United States Patent
Sugawara et al.

(10) Patent No.: US 7,688,506 B2
(45) Date of Patent: Mar. 30, 2010

(54) SCREEN AND IMAGE PROJECTION APPARATUS

(75) Inventors: Yutaka Sugawara, Tokyo (JP); Hiroki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 11/656,359

(22) Filed: Jan. 22, 2007

(65) Prior Publication Data
US 2007/0171521 A1    Jul. 26, 2007

(30) Foreign Application Priority Data
Jan. 25, 2006   (JP)   ............... P2006-016615

(51) Int. Cl.
G03B 21/56   (2006.01)
(52) U.S. Cl. .................................. 359/446
(58) Field of Classification Search ............ 359/446, 359/444–445
See application file for complete search history.

(56) References Cited

U.S. PATENT DOCUMENTS

| 1,778,084 | A | * | 10/1930 | Nevin | 359/444 |
| 1,955,682 | A | * | 4/1934 | Newman et al. | 359/444 |
| 3,125,927 | A | * | 3/1964 | Erban | 359/446 |
| 3,610,728 | A | * | 10/1971 | Firth | 359/446 |
| 3,640,602 | A | * | 2/1972 | Wolfe | 359/446 |
| 4,143,943 | A | * | 3/1979 | Rawson | 359/446 |
| 4,317,618 | A | * | 3/1982 | Murakoshi | 359/446 |
| 5,025,474 | A | * | 6/1991 | Tanaka et al. | 381/333 |
| 5,798,582 | A | * | 8/1998 | Neff | 310/13 |
| 7,283,637 | B2 | * | 10/2007 | Suzuki et al. | 381/152 |
| 2006/0268241 | A1 | * | 11/2006 | Watson et al. | 353/94 |
| 2008/0117505 | A1 | * | 5/2008 | Sandburg | 359/446 |

FOREIGN PATENT DOCUMENTS

| JP | 55-065940 | 5/1980 |
| JP | 2004-133478 | 4/2004 |

OTHER PUBLICATIONS

Wang et al, "Speckle Reduction in Laser Projection Systems by Diffractive Optical Elements," Applied Opt. 37, 1770-1775 (1998).*
Rawson et al, "A Speckle Free Rear Projection Screen Using Two Close Screens in Slow Relative Motion", J. Optical Society of America, 66, 1290-1294 (1976).*

* cited by examiner

*Primary Examiner*—Christopher E Mahoney
*Assistant Examiner*—Leon W Rhodes
(74) *Attorney, Agent, or Firm*—Wolf, Greenfield & Sacks, P.C.

(57) ABSTRACT

Light emitted from a light source is modulated and projected on a screen. The screen includes a securing member, a diffuser plate supported by the securing member using a plurality of elastic members, where the elastic members are disposed so that the diffuser plate is resiliently displaced in two directions in the plane of the diffuser plate, and a driving unit that moves the diffuser plate with respect to the securing member in the two directions in the plane of the diffuser plate.

5 Claims, 7 Drawing Sheets

10

6 5 4 1

PRIOR ART

SCREEN AND IMAGE PROJECTION APPARATUS

CROSS REFERENCES TO RELATED APPLICATIONS

The present invention contains subject matter related to Japanese Patent Application JP 2006-016615 filed in the Japanese Patent Office on Jan. 25, 2006, the entire contents of which are incorporated herein by reference.

BACKGROUND OF THE INVENTION

1. Field of the Invention

The present invention relates to a screen and an image projection apparatus used for, for example, projection television sets for modulating light that contains coherent light and that is emitted from a light source and projecting the light onto the screen.

2. Description of the Related Art

Image projection apparatuses (optical projectors) are known that illuminate a light modulation unit, such as a liquid crystal panel, a digital micromirror device (DMD), or a light modulation element using a diffraction grating, using an illumination unit so as to project light transmitted or reflected by the light modulation unit onto a screen using a projection lens. Such image projection apparatuses separate the light into light in the red, green, and blue wavelength ranges, modulate the light of each color using the light modulation unit, and project the light of each color onto the screen so as to overlap the light. Thus, a color image is displayed. In general, a high-pressure mercury vapor lamp that provides high luminous efficiency in the visible light range is used for a light source of the image projection apparatuses. By using a high-pressure mercury vapor lamp, the image projection apparatuses can efficiently emit illumination light.

For example, rear-projection television sets in which an image modulated by a light modulation unit is projected onto the rear surface of a screen have several distinguishing characteristics among the currently available wide-screen television sets. In particular, in recent years, a wide screen liquid crystal television sets and plasma television sets have been in widespread use. The rear projection television sets have an advantage over the liquid crystal television sets and plasma television sets in terms of the weight and cost.

However, it is difficult for the rear-projection television sets to prevent the occurrence of shimmering across the screen known as scintillation caused by the nature of the screen, and therefore, it is difficult to provide images with a natural appearance.

Additionally, in recent years, a laser, in place of the high-pressure mercury vapor lamp, has been in widespread use as a light source for projection. A light source such as a semiconductor laser has a sharp spectrum compared with existing discharge lamps. Accordingly, the laser can provide a wide color range. In addition, the lifetime of the laser is longer than that of the lamp.

However, when the laser is used as the light source, viewers see a number of bright spots across the screen, referred to as speckle. The above-described scintillation is primarily caused by incoherent light from a diffusion material contained in the screen. In contrast, when a laser beam, which is coherent light, is emitted onto the screen, shimmering with perspective occurs due to the interference of the light. At that time, the viewers recognize the shimmering as speckle.

To reduce the speckle, for example, a method for vibrating the entire screen is proposed (refer to, for example, Japanese Unexamined Patent Application Publication No. 55-65940).

In addition, to reduce the speckle and the scintillation, for example, a method for providing two layers having a diffusing function on the screen is proposed (refer to, for example, Japanese Unexamined Patent Application Publication No. 2004-133478).

SUMMARY OF THE INVENTION

As shown by a schematic diagram in FIG. 8, in Japanese Unexamined Patent Application Publication No. 55-65940, an the entirety of a screen 60 is finely vibrated by means of a vibrating mechanism 50 (e.g., a piezoelectric bimorph element). However, to vibrate the entire screen 60, significantly high power is needed, and therefore, it is difficult to vibrate the screen 60. In particular, in recent years, large rear-projection television sets have been developed. To vibrate the entirety of a screen of such a large rear-projection television set, a large and complicated vibrating mechanism is needed. However, it is very difficult to apply such a mechanism to consumer electronic appliances.

FIG. 9 is a schematic cross-sectional view of a screen described in Japanese Unexamined Patent Application Publication No. 2004-133478. As shown in FIG. 9, a screen 70 includes, in the following order from a light source side, a Fresnel lens unit 73 and a lenticular lens unit 72. A diffuser unit 71 having a relatively strong diffusing feature is disposed on the surface of the lenticular lens unit 72 on the light output side thereof (on the side adjacent to an observer). A diffuser unit 74 having a relatively weak diffusing feature is disposed on the surface of the Fresnel lens unit 73 on the light input side thereof (on the side adjacent to a light source).

To reduce speckle and scintillation, diffusing the light is effective. However, as the amount of diffusion is increased, the gain of light emitted from the light source decreases and the resolution decreases.

In Japanese Unexamined Patent Application Publication No. 2004-133478, as shown in FIG. 9, two diffuser units are provided in order to reduce a diffusion material contained in one diffusing sheet and avoid the decrease in the gain and the resolution. However, even in such a structure, the speckle cannot be sufficiently reduced when a laser is used for the light source.

In addition, when the number of diffusing sheets is increased, the structure of the screen becomes further complicated. Accordingly, the weight of the screen is increased.

Although it is well known that the operation of a diffusing sheet alone can reduce the degree of speckle and scintillation, it is difficult to manufacture such a diffusing sheet on a commercial basis in terms of cost and reliability.

Furthermore, when the screen is vibrated, the vibration stops at the positive and negative ends of the amplitude of the vibration, although in a very short period of time. At that time, speckle or scintillation becomes noticeable.

Accordingly, the present invention provides a screen capable of reducing speckle or scintillation occurring on a screen of an image projection apparatus, such as a projection television set, by employing a simplified and practical structure.

According to an embodiment of the present invention, light emitted from a light source is modulated and is projected on a screen. The screen includes a securing member, a diffuser plate supported by the securing member using a plurality of elastic members, where the elastic members are disposed so that the diffuser plate is resiliently displaced in two directions in the plane of the diffuser plate, and a driving unit that moves the diffuser plate with respect to the securing member in the two directions in the plane of the diffuser plate.

The diffuser plate can be indirectly supported by the securing member using a connecting member disposed between the elastic members.

The plurality of elastic members can include at least two leaf springs. At least one of the leaf springs can be disposed so that a length direction thereof is directed along one of the two directions, the other leaf springs can be disposed so that length directions thereof are directed along the other of the two directions, and width directions of the at least two leaf springs can be directed along an optical axis of the light emitted from the light source.

In addition, the driving unit of the screen can include a voice coil motor (VCM).

According to another embodiment of the present invention, an image projection apparatus includes a light source for emitting light, the screen according to the present invention, and a light modulation unit configured to modulate the light emitted from the light source and project the light onto the screen so as to display an image. That is, in this screen, a diffuser plate is supported by a securing member using a plurality of elastic members, the elastic members are disposed so that the diffuser plate is resiliently displaced in two directions in the plane of the diffuser plate, and a driving unit moves the diffuser plate with respect to the securing member in the two directions in the plane of the diffuser plate.

As noted above, in the screen and the image projection apparatus according to the present invention, the diffuser plate is supported by a securing member using a plurality of elastic members (e.g., leaf springs), the elastic members are disposed so that the diffuser plate is resiliently displaced in two directions in the plane of the diffuser plate, and a driving unit (e.g., a voice coil motor) moves the diffuser plate with respect to the securing member in the two directions in the plane of the diffuser plate.

By supporting the diffuser plate of the screen using a plurality of elastic members which are disposed so that the diffuser plate is resiliently displaced in two directions in the plane of the diffuser plate, the screen can move in the two directions in the plane thereof (e.g., in the horizontal direction and the vertical direction)

To dispose the screen so that the diffuser plate is resiliently displaced in two directions in the plane of the diffuser plate, for example, the diffuser plate can be indirectly supported by the securing member using a connecting member disposed between the elastic members. Thus, the screen can be resiliently and smoothly displaced in the two directions using a simplified structure.

In addition, by moving the diffuser plate relative to the securing member that directly or indirectly supports the diffuser plate, the diffuser plate can easily perform a circular motion or an elliptic motion with no stop points. Consequently, the amount of speckle and scintillation can be reliably reduced.

As noted above, according to the embodiments of the present invention, the degree of speckle and scintillation which occur on a screen of an image projection apparatus can be reduced with a relatively simple and practical structure.

DESCRIPTION OF THE PREFERRED EMBODIMENTS

Exemplary embodiments of the present invention are described below with reference to the accompanying drawings. However, it should be noted that the present invention is not limited thereto.

Figure 1:
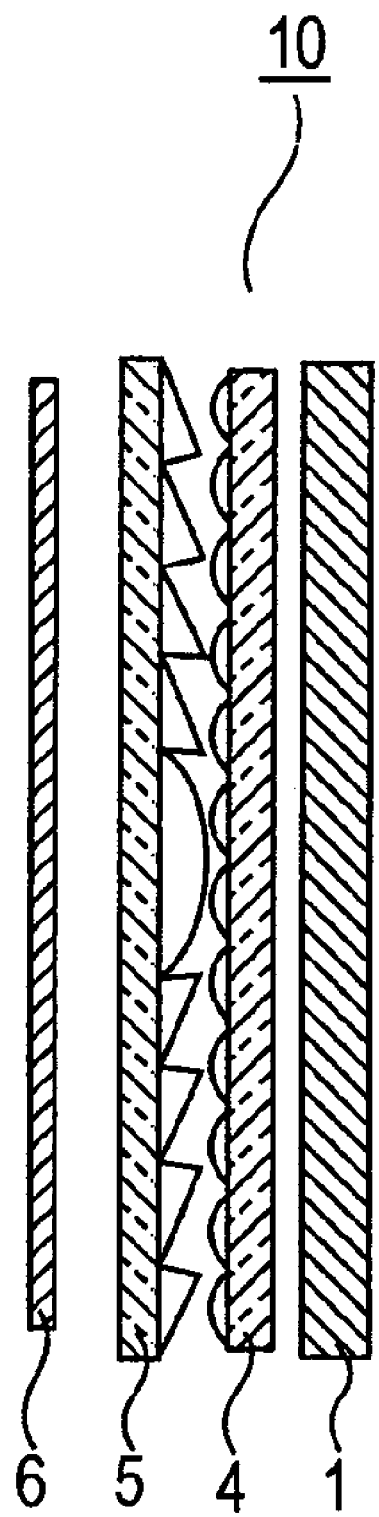
FIG. 1 is a schematic cross-sectional view of a screen according to an embodiment of the present invention.

FIG. 1 is a schematic cross-sectional view of a screen according to an embodiment of the present invention. In general, as shown in FIG. 1, a screen used for an image projection apparatus, such as a rear-projection television set, includes, in the following order from a viewer side, a diffuser plate 1, a lenticular lens unit 4, a Fresnel lens unit 5, and a diffuser plate 6.

In the present embodiment, the diffuser plate 6 is disposed closer to a light source than the Fresnel lens unit 5. The diffuser plate 6 is disposed in a securing member (e.g., a housing) so as to be movable in two directions in the plane of the screen, that is, in two directions in the plane of the diffuser plate 6 by using an elastic member.

Figure 2:
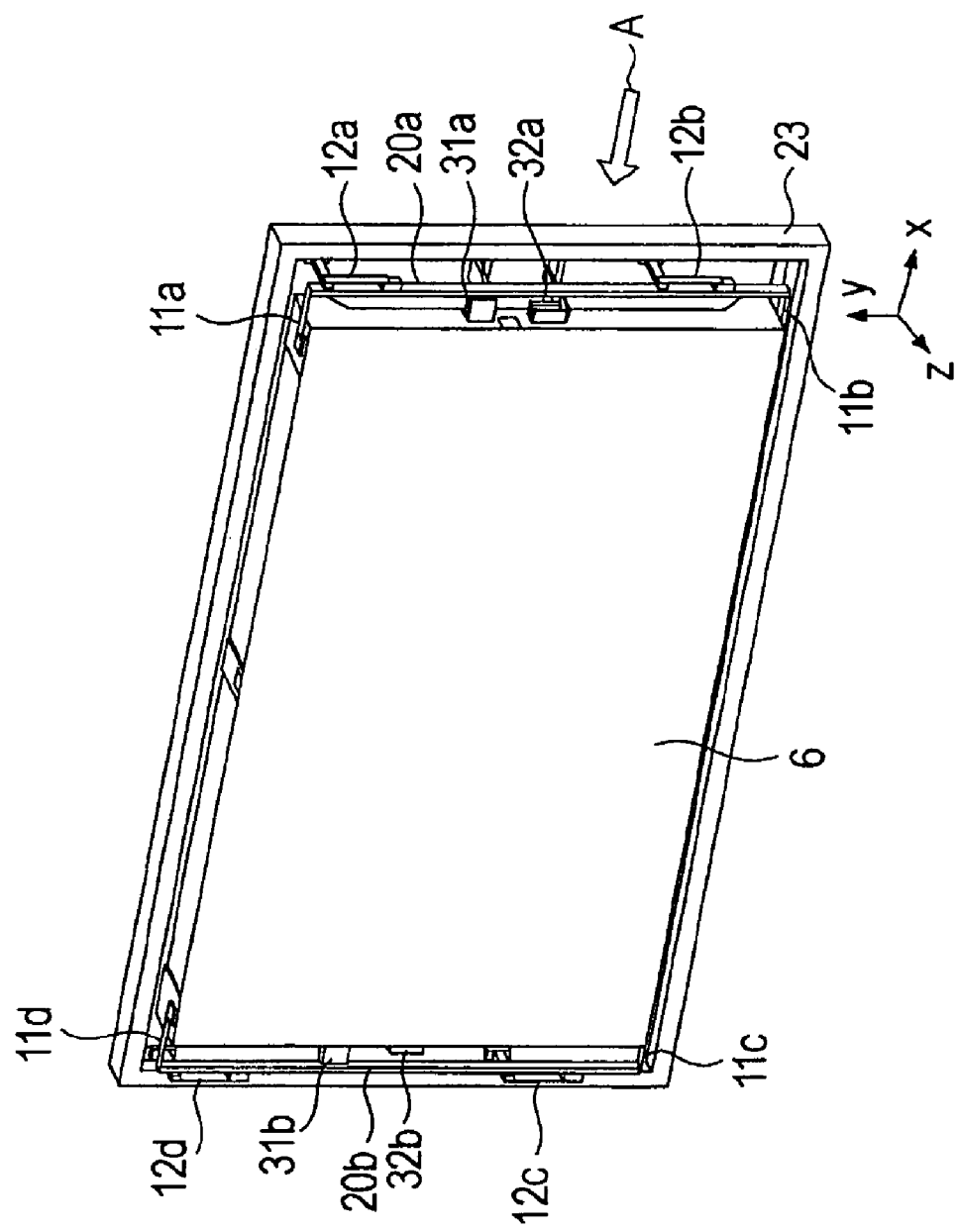
FIG. 2 is a schematic perspective view of a main portion of the screen according to the embodiment of the present invention.

FIG. 2 is a schematic perspective view of the main portion of the present embodiment using a leaf spring as the elastic member. In the present embodiment, the diffuser plate 6 is supported by a securing member 23 that serves as part of the housing using eight leaf springs and connecting members 20*a* and 20*b* that indirectly support the diffuser plate 6. As shown in FIG. 2, the horizontal direction of the diffuser plate 6 is indicated by an arrow x, the vertical direction of the diffuser plate 6 is indicated by an arrow y, and the optical axis of light passing through the diffuser plate 6 is indicated by an arrow z.

As shown in FIG. 2, one end of a first leaf spring 11*a*, one end of a first leaf spring 11*b*, one end of a first leaf spring 11*c*, and one end of a first leaf spring 11*d* are connected to the corresponding sides of the upper surface and sides of the lower surface of the diffuser plate 6. Each of the first leaf springs 11*a* to 11*d* has a length in the horizontal direction (the x direction) and has a width in the optical axis direction of the light passing through the diffuser plate 6 (the z direction). The connecting members 20*a* and 20*b* extend along the left and right side surfaces of the diffuser plate 6, respectively. That is, the connecting members 20*a* and 20*b* extend in the vertical direction (the y direction). The other ends of the first leaf springs 11*a* to 11*d* are secured to the corresponding upper and lower ends of the connecting member 20*a* or the corresponding upper and lower ends of the connecting member 20*b*. Thus, the first leaf springs 11*a* to 11*d* apply a resilient force in the vertical direction (the y direction).

The connecting member 20a is connected to the securing member 23 using second leaf springs 12a and 12b, whereas the connecting member 20b is connected to the securing member 23 using second leaf springs 12c and 12d. Each of the second leaf springs 12a to 12d has a length in the vertical direction (the y direction) and has a width in the optical axis direction of the light passing through the diffuser plate 6 (the z direction). Therefore, the second leaf springs 12a to 12d apply a resilient force in the horizontal direction (the x direction).

That is, in the present embodiment, the diffuser plate 6 is indirectly supported by the securing member 23 so as to be resiliently displaced in the vertical direction by means of the first leaf springs 11a and 11b and resiliently move in the horizontal direction by means of second leaf springs 12a and 12b. As noted above, by being supported by the securing member via the connecting members, the diffuser plate 6 can smoothly move in two directions, such as the horizontal and vertical directions.

The leaf springs and the other members can be secured in a variety of ways, for example, by means of an adhesive agent or screws.

Alternatively, the connecting member may be a member extending in the horizontal direction in place of the member extending in the vertical direction as shown in the present embodiment. Even in this case, by disposing and securing the elastic members (such as leaf springs) so that the diffuser plate 6 is resiliently displaced in the horizontal and vertical directions, the diffuser plate 6 can resiliently move in two directions in the plane of the diffuser plate 6 in the same way.

In addition, in the present embodiment, driving units 31a and 31b capable of driving the diffuser plate 6 in the horizontal direction (the x direction) and driving units 32a and 31b capable of driving the diffuser plate 6 in the vertical direction (the y direction) are disposed between the left side surface of the diffuser plate 6 and the securing member 23 and between the right side surface of the diffuser plate 6 and the securing member 23.

Figure 3:
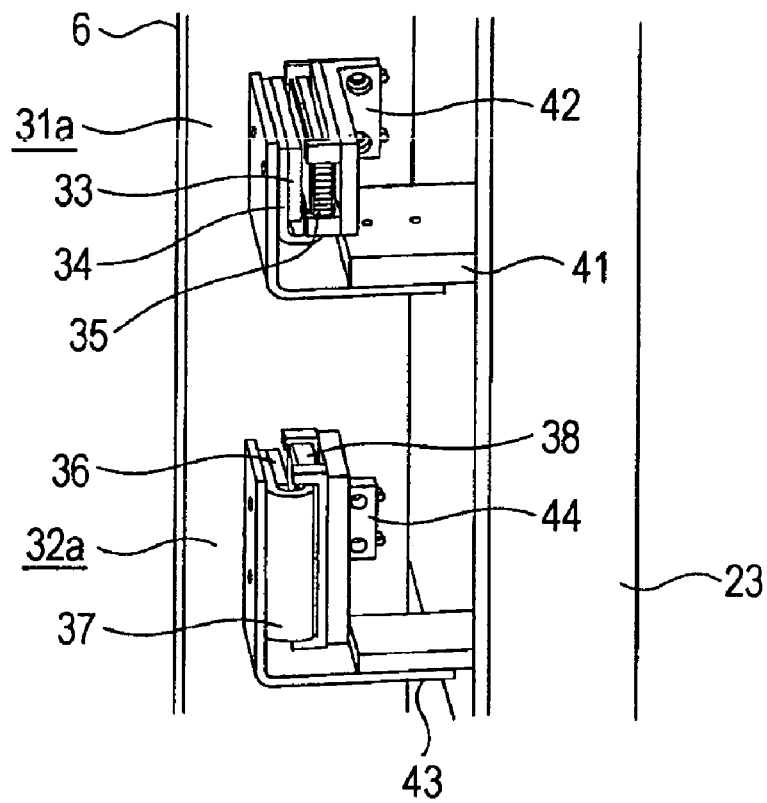
FIG. 3 is a schematic perspective view of another main portion of the screen according to the embodiment of the present invention.

FIG. 3 is a schematic perspective view of the present embodiment when voice coil motors (VCMs) are used for the driving units 31a and 32a. In this case, FIG. 3 is a view of the right side surface of the diffuser plate 6 viewed from a direction indicated by an arrow A shown in FIG. 2.

As shown in FIG. 3, each of the driving units 31a and 32a includes a magnetic circuit composed of a magnet, a yoke, and a coil so as to enable driving of the diffuser plate 6 contactlessly by an electromagnetic force. For example, a magnet 33 and a yoke 34 of the driving unit 31a are secured to the securing member 23 whereas a coil 35 is secured to the diffuser plate 6. Similarly, a magnet 36 and a yoke 37 of the driving unit 32a are secured to the securing member 23 whereas a coil 38 is secured to the diffuser plate 6. Like the driving units 31a and 32a, the driving units 31b and 32b shown in FIG. 2 are disposed and secured so as to have driving directions that are mutually perpendicular.

Thus, the driving units 31a and 32a can move the diffuser plate 6 in the horizontal direction indicated by an arrow x with respect to the securing member 23. The driving units 31b and 32b can move the diffuser plate 6 in the vertical direction indicated by an arrow y with respect to the securing member 23.

In addition, as noted above, even when a connecting member that extends in the horizontal direction is used, the diffuser plate 6 can be moved in the two directions by changing the arrangement direction of the driving units and driving the diffuser plate 6 in the two directions.

By applying sine-wave voltages having, for example, a 90-degree phase difference to the driving units 31a and 32a disposed so as to have mutually perpendicular driving directions, an electromagnetic force that drives the diffuser plate 6 into a substantially circular motion can be generated.

Figure 4:
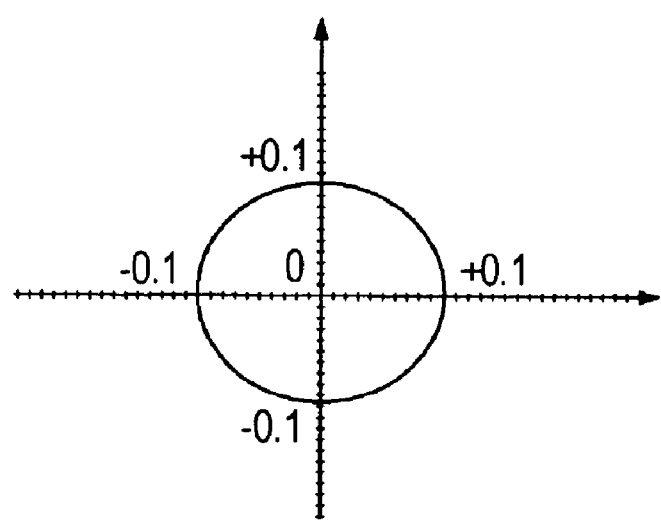
FIG. 4 illustrates an example of the displacement of the screen according to the embodiment of the present invention.

FIG. 4 illustrates an example of the displacement in an actual operation. When a voltage of 10 Vpp (peak to peak) was applied for each of the horizontal direction and the vertical direction, a circular motion having a diameter of 0.2 mm was able to be induced. In this case, the frequency of the circular motion was about 2 Hz and the linear velocity was 1.2 mm/s. When the driving units were applied to a screen, the driving units were able to reduce scintillation and speckle noise to one third of the original values thereof.

Note that, in the above-described embodiment, a leaf spring is used as the elastic member for supporting the diffuser plate 6. However, any elastic material that can apply an appropriate resilient force, such as a rubber material or a coil spring, can be used for the elastic member. When the leaf spring is used, the screen can be produced in a relatively simplified way and at low cost.

In addition, when VCMs are used for the driving units, an electromagnetic force is used. Accordingly, the driven diffuser plate 6 is not in contact with the securing member 23. Thus, deflection or distortion of the screen is not generated even when the diffuser plate 6 of the screen expands and contracts due to variation of the temperature, since the screen is not in contact with the securing member 23. Consequently, the occurrence of an error during a driving operation can be advantageously reduced compared with a mechanical driving mechanism.

An image projection apparatus using the screen according to the embodiment of the present invention is described next. First, image projection apparatuses including a transmissive or reflective liquid crystal panel serving as a light modulation unit are described. Each of the image projection apparatuses can be applied to, for example, a projection television set, a large-screen projector, or a computer for projecting an image.

Figure 5:
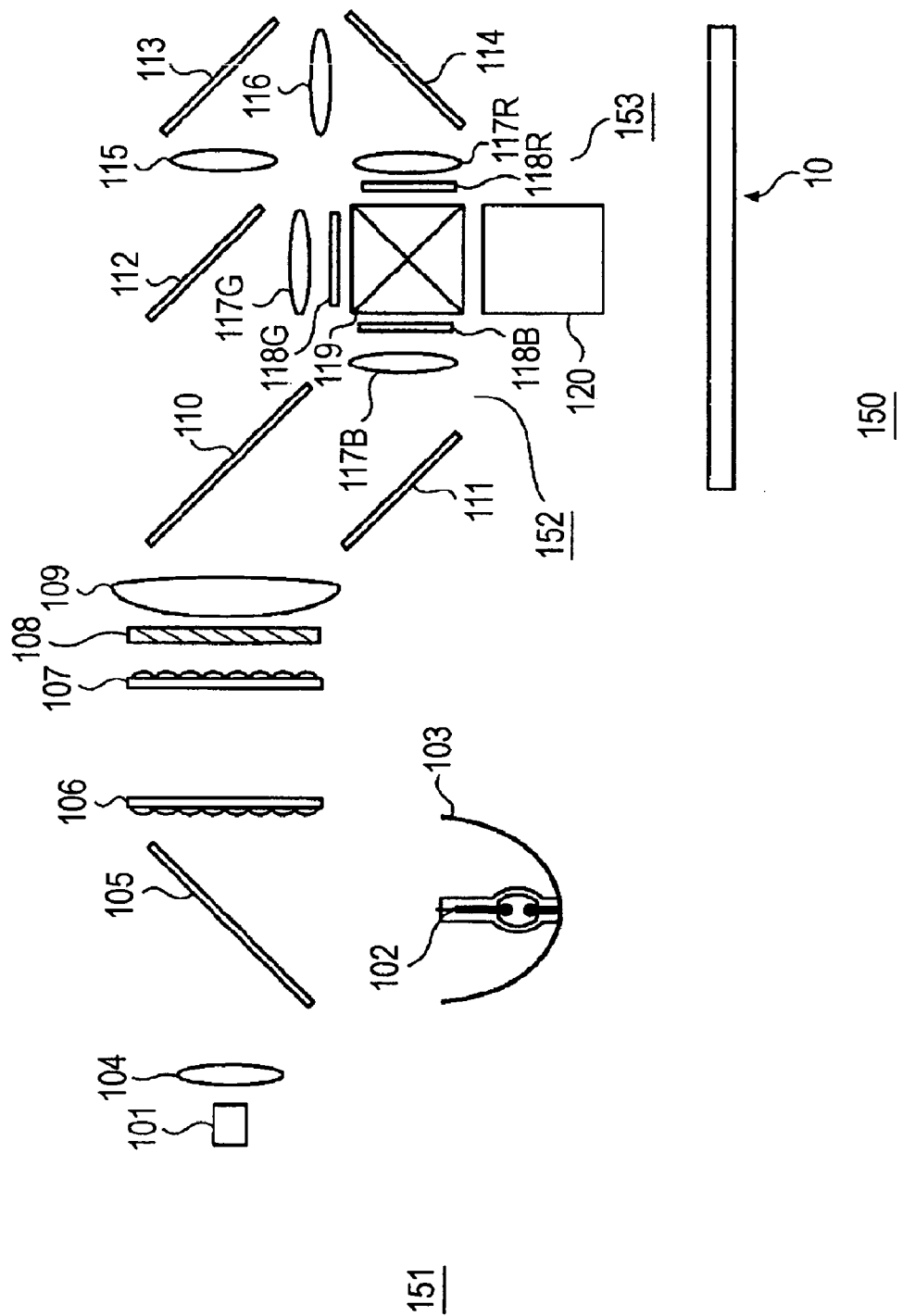
FIG. 5 is a block diagram of an image projection apparatus according to an embodiment of the present invention.

FIG. 5 is a block diagram of an image projection apparatus 150 according to an embodiment of the present invention. As shown in FIG. 5, a light source 151 of the image projection apparatus 150 includes a solid-state light source 101 composed of, for example, a red laser diode and a discharge lamp 102, such as a high-pressure mercury vapor lamp. The discharge lamp 102 is provided with a reflector 103. The reflector 103 has a reflecting surface for reflecting light in the form of a substantially parallel light beam. In this embodiment, the discharge lamp 102 is disposed on an optical axis at an angle of 90° with respect to an optical axis of a light beam emitted from the solid-state light source 101 so as to face a dichroic mirror 105. A condenser lens 104, such as a collimating lens, a first dichroic mirror 105, a first fly-eye lens 106, a second fly-eye lens 107, a polarizing beam splitter 108, a condenser lens 109, a dichroic mirror 110, a dichroic mirror 112, a lens 115, and a mirror 113 are disposed in this order on an optical axis of light output from the solid-state light source 101.

In contrast, a mirror 111 is disposed on the reflecting side of the dichroic mirror 110. A field lens 117B and a liquid crystal panel 118B are disposed on an optical axis whose optical path is changed by, for example, 90° by the mirror 111. Similarly, a field lens 117G and a liquid crystal panel 118G are disposed on the reflecting side of the dichroic mirror 112. A mirror 114 is disposed on the reflecting side of the mirror 113 via a lens 116. A field lens 117R and a liquid crystal panel 118R are disposed on an optical axis that is changed, for example, at 90° by the mirror 114. Thus, a light modulation unit 152 is formed. A cross prism 119 is disposed on the output sides of the liquid crystal panels 118R, 118G, and 118B. A projection optical unit 153 including a projection lens 120 is disposed on the output side of the cross prism 119.

The red laser diode of the solid-state light source 101 can have a resonance frequency of about 645 nm and the full width at half maximum of about 1.5 nm. Such a red laser diode provides a light source having an exceedingly monochromatic output. In contrast, a high-pressure mercury vapor lamp can be used for the discharge lamp 102 serving as the second light source. The light emitted from the high-pressure mercury vapor lamp has a sharp spectrum in the blue and green wavelength ranges, but a broad spectrum in the red wavelength range.

In the structure shown in FIG. 5, the solid-state light source 101 including, for example, a red laser diode emits a light beam. The light beam is converted to a substantially parallel light beam by the condenser lens 104 and is made incident on the first dichroic mirror 105. Most of this light beam passes through the dichroic mirror 105. A light beam emitted from the discharge lamp 102 (e.g., a high-pressure mercury vapor lamp) is changed to a substantially parallel light beam by the reflector 103 and is made incident on the first dichroic mirror 105. The light beam emitted from the discharge lamp 102 partially passes through the first dichroic mirror 105 and the other light beam is reflected by the first dichroic mirror 105.

The light beam emitted from the solid-state light source 101 and transmitted by the first dichroic mirror 105 and the light beam emitted from the discharge lamp 102 and reflected by the first dichroic mirror 105 are made incident on the first fly-eye lens 106 and the second fly-eye lens 107. The first fly-eye lens 106 and the second fly-eye lens 107 make the spatial distribution of the input light beam emitted from the light sources uniform. The light beam passing through the first fly-eye lens 106 and the second fly-eye lens 107 is made incident on the polarizing beam splitter 108. The polarizing beam splitter 108 aligns the polarization direction to a predetermined direction. The light beam transmitted by the polarizing beam splitter 108 is collected by the condenser lens 109. The collected light beam is then made incident on the dichroic mirror 110.

The dichroic mirror 110 reflects the light beam in the blue wavelength range and transmits the light beams in the green and red wavelength ranges. The dichroic mirror 112 is disposed on the output side of the dichroic mirror 110 in terms of the transmitted light. The dichroic mirror 112 reflects the light beam in the green wavelength range and transmits the light beam in the red wavelength range. Thus, the light beams emitted from the solid-state light source 101 and the discharge lamp 102 are separated into red, green, and blue light beams. The separated light beams are made incident on the transmissive light modulation units of the corresponding colors, namely, the liquid crystal panels 118R, 118G, and 118B in this embodiment. That is, in this embodiment, the blue light beam is reflected by the mirror 111. The reflected blue light beam passes through the field lens 117B and is made incident on the liquid crystal panel 118B that modulates the blue light beam. The green light beam passes through the field lens 117G and is made incident on the liquid crystal panel 118G that modulates the green light beam. The red light beam passes through the lens 115, the mirror 113, and the lens 116. The red light beam is then reflected by the mirror 114 and passes through the field lens 117R. The red light beam is made incident on the liquid crystal panel 118R that modulates the red light beam.

The light beams in the red, green, and blue wavelength ranges are image-modulated by the light modulation unit 152 including the transmissive liquid crystal panels. Subsequently, the modulated light beams are combined by the cross prism 119. The combined light beam is projected from the projection optical unit 153 including the projection lens 120 onto a screen 10 having the structure according to the embodiment of the present invention described with reference to FIGS. 1 to 3.

The image projection apparatus 150 may include a receiving unit, such as an analog tuner and a digital tuner for receiving terrestrial broadcasting and satellite broadcasting, a video signal processing unit and an audio signal processing unit for processing a video signal and an audio signal received by the receiving unit, and an audio signal output unit (such as a speaker) for outputting the audio signal processed by the audio signal processing unit (neither is shown). In such a structure, by inputting an output signal from the video signal processing unit to the light modulation unit 152, a rear-projection television set that projects the received video information in the form of an image can be achieved.

In this case, the amount of light in the red wavelength range emitted from the discharge lamp 102, which is a second light source of the light source 151, can be controlled by appropriately selecting the transmission wavelength ranges of the dichroic mirrors 105 and 112.

Here, for example, let the wavelength of the dichroic mirror 105 for the transmission ratio of 50% be 565 nm and the wavelength of the dichroic mirror 112 for the transmission ratio of 50% be 600 nm. In this case, the light beam emitted from the discharge lamp 102 (i.e., the second light source) is made incident on the liquid crystal panels 118B and 118G that are the light modulation units responsible for a blue color and a green color, respectively. In contrast, only the light beam emitted from the solid-state light source 101 (i.e., the first light source) is made incident on the liquid crystal panel 118R that is the light modulation unit responsible for a red color. As noted above, when the light beam emitted from the discharge lamp 102, such as a high-pressure mercury vapor lamp, is not made incident on the light modulation unit responsible for a red color and only the light beam emitted from the solid-state light source 101, such as a red laser diode, is made incident on the light modulation unit responsible for a red color, each of the spectrums of the light beams in the blue, green, and red color ranges can be sharp. By using these color light beams having such spectrums to display a color image, a projection apparatus having a significantly wide color range can be achieved.

In the above-described structure in which the light beam emitted from the discharge lamp 102 does not reach the liquid crystal panel for modulating red light, when the wavelength of the dichroic mirror 105 for the transmission ratio of 50% is 565 nm, the wavelength of the dichroic mirror 112 for the transmission ratio of 50% can be in the range of about 580 nm to about 630 nm so that the dichroic mirror 112 reflects all the light beams emitted from the discharge lamp 102 and reflected by the first dichroic mirror 105 and transmits all the light beams emitted from the solid-state light source 101.

In addition, in this embodiment, although only the light beam emitted from the discharge lamp 102 (the second light source) is made incident on the liquid crystal panels that are the light modulation units responsible for blue and green colors and only the light beam emitted from the solid-state light source 101 (the first light source) is made incident on the liquid crystal panel that is the light modulation unit responsible for a red color, the optical paths of these light beams are temporarily combined by the dichroic mirror 105. If, as described above, the optical paths are temporarily combined, the structure of the apparatus can be simplified compared with an apparatus in which light beams of three colors are independently incident on the corresponding light modulation units without combining the light beams. As a result, a high-performance and compact image projection apparatus can be advantageously achieved.

Furthermore, by appropriately selecting the transmission wavelength of each of the dichroic mirrors, a light beam in a red color range which is part of the light beam emitted from the discharge lamp 102 can be overlapped with the red light beam emitted from the solid-state light source 101, and the combined overlapped light beam can be made incident on the light modulation unit responsible for a red color.

As noted above, even in the image projection apparatus 150 that uses light beams emitted from the solid-state light source 101 and the discharge lamp 102, it used to be difficult to reduce scintillation and speckle. However, by using the screen according to the above-described embodiment, scintillation and speckle can be reliably reduced with a relatively simple and practical structure.

An example in which a reflective liquid crystal panel is used for the light modulation unit is described next.

Figure 6:
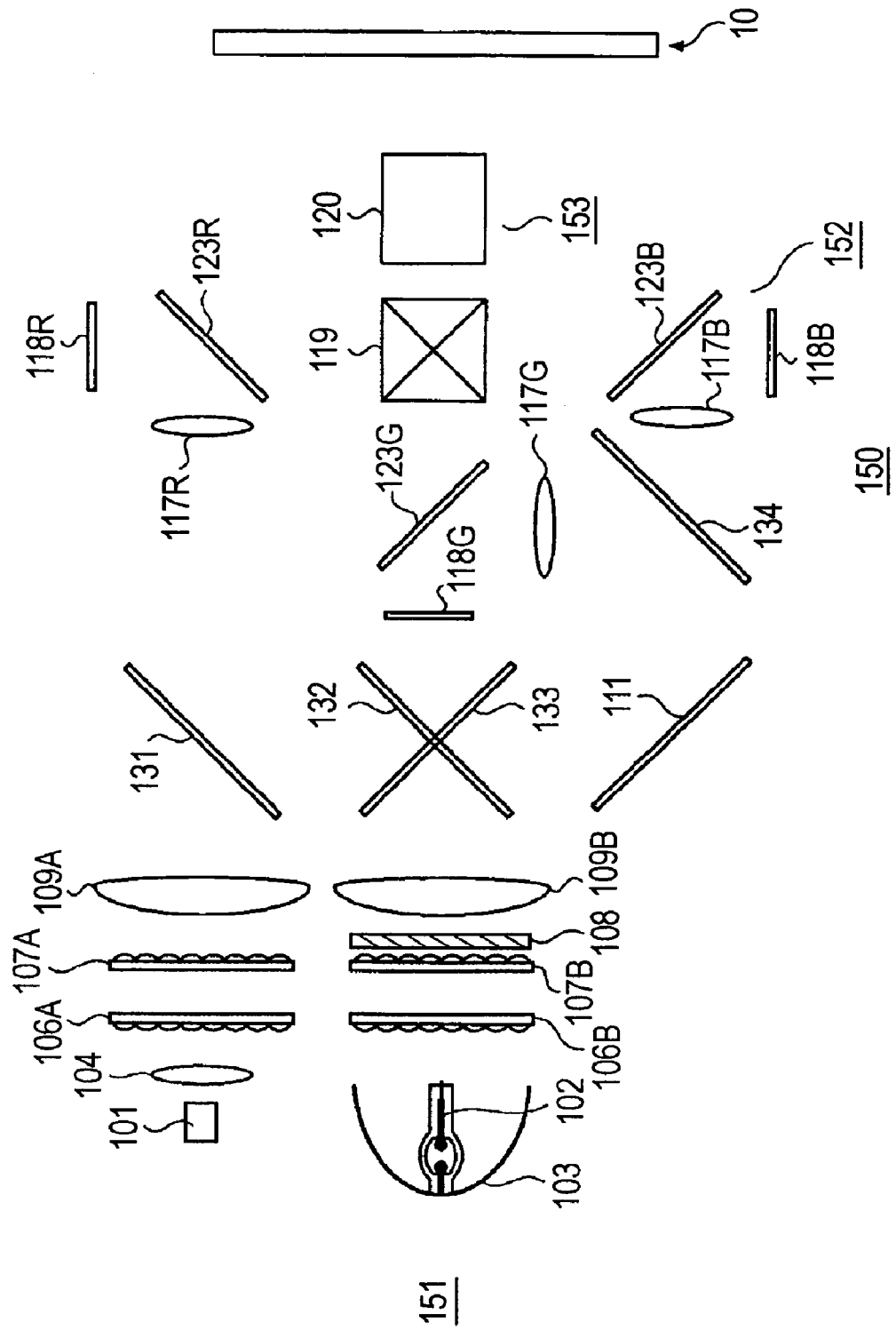
FIG. 6 is a block diagram of an image projection apparatus according to an embodiment of the present invention.

FIG. 6 is a schematic diagram of an exemplary image projection apparatus having such a structure. Similar numbering will be used in describing FIG. 6 as was utilized above in describing FIG. 5.

Like the above-described example, the light source 151 includes the discharge lamp 102 and the solid-state light source 101 composed of, for example, a red semiconductor laser diode. A collimating lens 104, a first fly-eye lens 106A, a second fly-eye lens 107A, a condenser lens 109A, and a dichroic mirror 131 are disposed in this order on an optical axis of light output from the solid-state light source 101.

A discharge lamp 102 is disposed so that the optical axis of the light beam output therefrom is substantially parallel to the output light beam of the solid-state light source 101. A first fly-eye lens 106B, a second fly-eye lens 107B, a polarizing beam splitter 108, a condenser lens 109B, and a combination of a dichroic mirror 132 for separating and reflecting a light beam in a red color range and a dichroic mirror 133 for reflecting a blue light beam and a green light beam are disposed in this order on an optical axis of light output from the discharge lamp 102.

A red light field lens 117R and a polarization separation element 123R are disposed on the output side of the dichroic mirror 131. A reflective liquid crystal panel 118R that is responsible for a red color is disposed on the optical axis whose optical path is changed by, for example, 90° by the polarization separation element 123R.

In addition, a mirror 111 is disposed on the reflecting side of the dichroic mirror 133 that is disposed on the output side of the discharge lamp 102, that is, on the optical axis whose optical path is changed by, for example, 90° by the dichroic mirror 133. A dichroic mirror 134 that reflects a green light beam is disposed on the optical axis whose optical path is changed by, for example, 90° by the mirror 111. A polarization separation element 123G is disposed on the reflecting side of the dichroic mirror 134 with a field lens 117G therebetween. A liquid crystal panel 118G that is responsible for a green color is disposed on the optical axis whose optical path is changed by, for example, 90° by the polarization separation element 123G.

Furthermore, the field lens 117B and a polarization separation element 123B are disposed in this order on the side towards which the light transmitted by the dichroic mirror 134 propagates. A reflective liquid crystal panel 118B is disposed on the optical path whose optical path is changed by, for example, 90° by the polarization separation element 123B. These liquid crystal panels 118R, 118G, and 118B form the light modulation unit 152 that modulates light in accordance with image information.

A cross prism 119 is disposed on the optical axes of the light beams reflected by the liquid crystal panels 118R, 118G, and 118B and transmitted through the polarization separation elements 123R, 123G, and 123B. A projection lens 120 is disposed on the output side of the cross prism 119. Thus, the projection optical unit 153 is formed.

Even in this case, the red laser diode of the solid-state light source 101 can have a resonance frequency of about 645 nm and the full width at half maximum of about 1.5 nm. In addition, as in the example shown in FIG. 5, a high-pressure mercury vapor lamp can be used for the discharge lamp 102 serving as the second light source.

In such a structure, the solid-state light source 101 (the first light source) emits a light beam. The light beam is converted to a substantially parallel light beam by the condenser lens 104. The first fly-eye lens 106A and the second fly-eye lens 107A make the spatial distribution of the parallel light beam uniform. The light beam is collected by the condenser lens 109A and is made incident on the dichroic mirror 131. Most of this light beam passes through the dichroic mirror 131. Similarly, a light beam emitted from the discharge lamp 102 serving as the second light source (e.g., a high-pressure mercury vapor lamp) is converted to a substantially parallel light beam by the reflector 103. The first fly-eye lens 106B and the second fly-eye lens 107B make the spatial distribution of the parallel light beam uniform. The polarizing beam splitter 108 aligns the polarization direction of the light beam, which is collected by the condenser lens 109B and is made incident on the dichroic mirror 132. The dichroic mirror 132 transmits the light beam in a predetermined wavelength range and reflects the other light beam. The reflected light beam is made incident on the dichroic mirror 131.

As noted above, the dichroic mirror 131 transmits most of the light beam emitted from the solid-state light source 101. In contrast, the dichroic mirror 131 reflects the light beam that is reflected by the dichroic mirror 132 and is made incident on the dichroic mirror 131 in a predetermined wavelength range and transmits the other light beam. For example, the separation wavelength of the dichroic mirror 131 is determined to be 575 nm. The dichroic mirror 131 transmits a light beam having a wavelength greater than 575 nm, that is, a light beam having a wavelength of about 645 nm (e.g., a light beam emitted from the red laser diode). In addition, the surface of the dichroic mirror 131 facing the dichroic mirror 132 has a characteristic so as to reflect a light beam having a wavelength greater than about 575 nm.

In contrast, the separation wavelength of the dichroic mirror 132 is determined to be, for example, about 570 nm. The dichroic mirror 132 reflects a red light beam having a wavelength greater than about 570 nm.

By appropriately determining the transmission and reflection wavelength characteristics of the dichroic mirrors 131 and 132, namely, the separation wavelengths of the dichroic mirrors 131 and 132, the proportion of a light beam emitted from the discharge lamp 102 that is in the red color range and eventually reaches the light modulation unit responsible for a red color can be suitably controlled.

The red light beam whose quantity is controlled as described above is modulated by the red light field lens 117R, the polarization separation element 123R, and the liquid crystal panel 118R that modulate a red light beam in accordance with image information.

In contrast, a light beam containing a green light beam and a blue light beam emitted from the discharge lamp 102 is reflected by the dichroic mirror 133 and is then reflected by the mirror 111. The reflected light beam is separated into the green light beam and the blue light beam by the dichroic mirror 134. The green light beam and the blue light beam propagate via the field lenses 117G and 117B and the polarization separation elements 123G and 123B that modulate the green light beam and the blue light, respectively. The green light beam and the blue light beam reach the liquid crystal panels 118G and 118B, respectively, where the green light beam and the blue light beam are modulated in accordance with the image information. The modulated light beams of the individual colors are combined by the cross prism 119. The projection optical unit 153 including the projection lens 120 projects the combined light beam onto the screen 10 having the structure described with reference to FIGS. 1 to 3.

Even in such a case, the image projection apparatus 150 may include a receiving unit, such as an analog tuner and a digital tuner for receiving terrestrial broadcasting and satellite broadcasting, a video signal processing unit and an audio signal processing unit for processing a video signal and an audio signal received by the receiving unit, and an audio signal output unit (such as a speaker) for outputting the audio signal processed by the audio signal processing unit (neither is shown). In such a structure, by inputting an output signal from the video signal processing unit to the light modulation unit 152, a rear-projection television set that projects the received video information in the form of an image can be achieved.

In this example, as described above, by appropriately determining the separation characteristics of the dichroic mirrors 131 and 132, the spectrum distributions in the red, green, and blue ranges can be adjusted to the desired distributions.

Furthermore, in this embodiment, as described above, by allowing the diffuser plate of the screen 10 to move, the degree of scintillation and speckle can be reliably reduced even when the solid-state light source, such as a laser, is used. As a result, an image having an excellent quality can be projected.

While image projection apparatuses have been described as including a liquid crystal panel serving as a light modulation element in the above-described embodiments of the present invention, in some embodiments, only a discharge lamp can be used as a light source. In such a case, by using the screen according to the embodiment of the present invention, the amount of scintillation can be reduced. Alternatively, the number and the type of solid-state light sources can be freely determined, such as the case where red, green, and blue laser diodes are used as solid-state light sources, where a red laser diode and a white laser diode are used as solid-state light sources, or where red and green laser diodes and a discharge lamp are used. If light containing coherent light, such as light emitted from a solid-state light source, is used, the amount of speckle can be reduced.

Furthermore, in addition to the light sources, the arrangement of the optical components can be changed in a variety of ways. For example, a reflective light modulation element, such as a DMD, can be used for the light modulation unit in place of the transmissive or reflective liquid crystal display panel.

Figure 7:
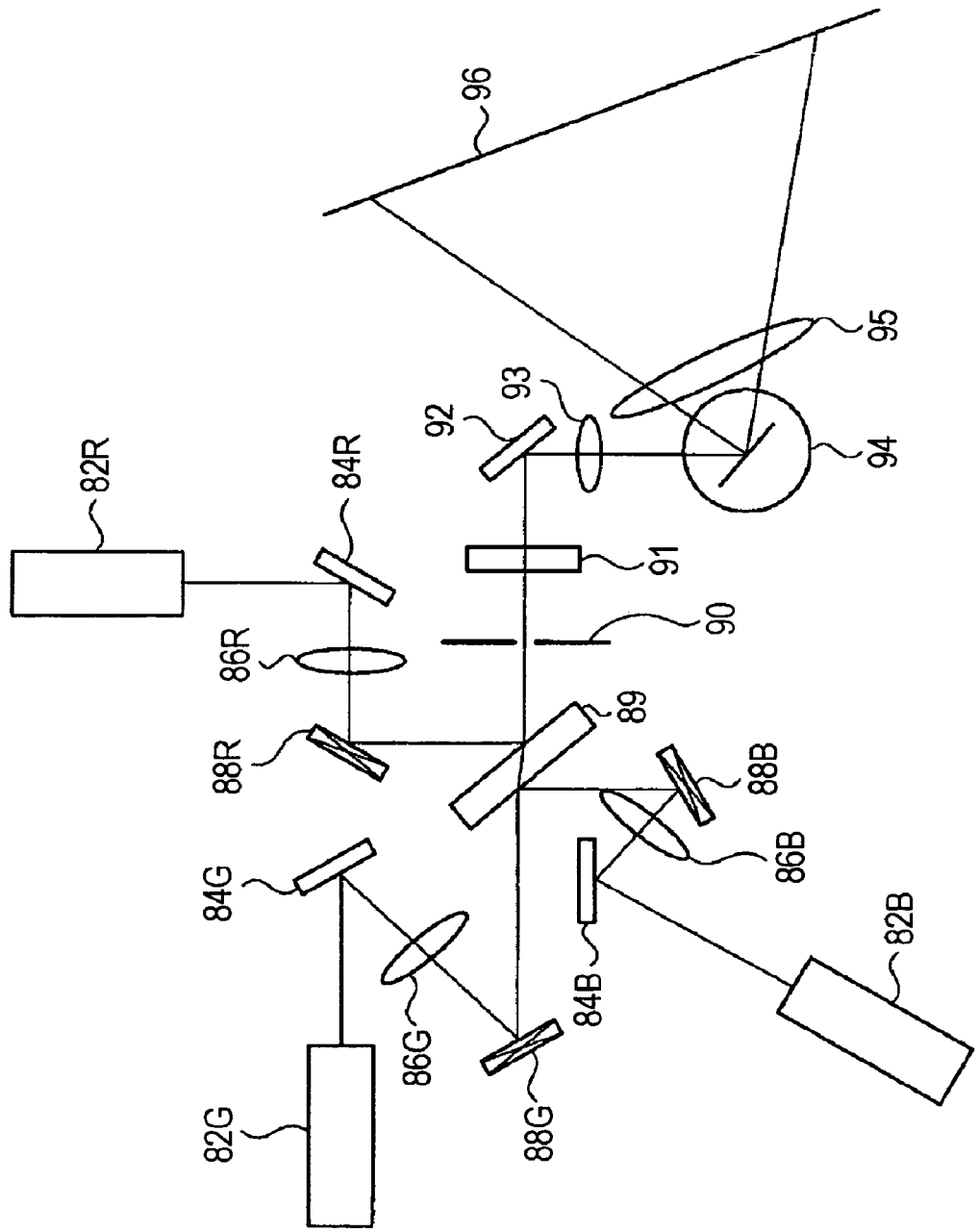
FIG. 7 is a block diagram of an image projection apparatus according to an embodiment of the present invention.
Figure 8:
FIG. 8 is a schematic diagram of the structure of a known screen.
Figure 9:
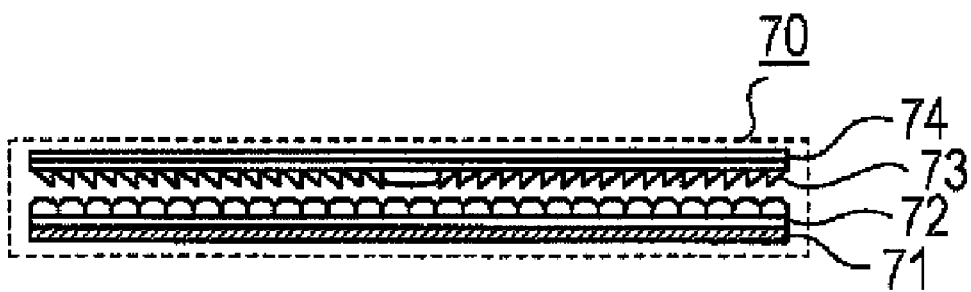
FIG. 9 is another schematic diagram of the structure of the known screen.

In another embodiment of the present invention, an image projection apparatus using a diffractive light modulation element is described next with reference to FIG. 7. FIG. 7 is a schematic diagram of an exemplary structure of the image projection apparatus using a diffractive light modulation element.

Like the above-described embodiments, this image projection apparatus can be applied to, for example, a large-screen projector and, in particular, a projector for a digital image, or a computer for projecting an image.

As shown in FIG. 7, an image projection apparatus 81 includes a red (R) laser light source 82R, a green (G) laser light source 82G, and a blue (B) laser light source 82. The image projection apparatus 81 further includes mirrors 84R, 84G, and 84B, illumination optical systems (lens group) 86R, 86G, and 86B, and diffractive light modulation elements 88R, 88G, and 88B, each of which is disposed on the optical axis of the corresponding color laser. As will be described below, the illumination optical systems (lens group) 86R, 86G, and 86B can reshape a light beam so that the light beams emitted from the light sources can efficiently illuminate the diffractive light modulation elements 88R, 88G, and 88B having a one-dimensional structure. The image projection apparatus 81 further includes a color combining filter 89, a spatial filter 90, a diffuser 91, a mirror 92, a lens 93, a scanning illumination system 94 (such as a galvanometer scanner), a projection optical system (lens group) 95, and a screen 96 described with reference to FIGS. 1 to 3. The color combining filter 89 combines the red, green, and blue laser beams whose intensities are modulated by the light modulation elements 88R, 88G, and 88B, respectively.

The laser light source 82R can include a laser diode that emits a red light beam having, for example, a wavelength of 642 nm and an optical output power of about 3 W. The laser light source 82G can include a laser diode that emits a green light beam having, for example, a wavelength of 532 nm and an optical output power of about 2 W. The laser light source 82B can include a laser diode that emits a blue light beam having, for example, a wavelength of 457 nm and an optical output power of about 1.5 W. However, the wavelengths and the optical output power of the laser light sources 82R, 82G, and 82B are not limited to these values.

Each of the diffractive light modulation elements 88R, 88G, and 88B can include, for example, an electrostatic driving device, such as a micro electro mechanical system (MEMS) using an electrostatic driving method. More specifically, an electrostatic driving device can be used in which a lower electrode is formed on a substrate and thin-film ribbon beams that serve as upper electrodes and that are electrically insulated from the lower electrode by space are arranged in a bridge shape so as to face the lower electrode. Each of the upper electrodes is displaced due to an electrostatic force or an electrostatic resistance force induced between the upper electrode and the lower electrode in accordance with electric potentials applied to the upper electrode and the lower electrode. For example, by displacing every other upper electrode towards the lower electrode formed on the substrate, this electrostatic driving device can function as a diffraction grating. When a coherent light beam is used, the intensity of a reflected light beam in a specific direction can be continuously and finely changed using the interference of light so as to change the gradation. In practice, several hundred to one thousand electrostatic driving devices, each including two or more beams (upper electrodes) arranged in parallel, are arranged in parallel for the same number of pixels. Thus, this electrostatic driving device can be used as a one-dimensional light modulation element. An example of an available commercial one-dimensional light modulation element is the Grating Light Valve (GLV) available from Silicon Light Machine, Inc.

In the image projection apparatus 81 having such a structure, the red, green, and blue laser light beams emitted from the laser light sources 82R, 82G, and 82B are simultaneously input from the illumination optical systems 86R, 86G, and 86B to the diffractive light modulation elements 88R, 88G, and 88B via the mirrors 84R, 84G, and 84B, respectively.

In addition, these laser beams are diffracted by the diffractive light modulation elements 88R, 88G, and 88B, respectively, so as to be spatially modulated. The diffracted light beams of three colors are combined by the color combining filter 89. Thereafter, only signal components are retrieved from the combined light beam by the spatial filter 90.

Subsequently, the diffuser 91 reduces the degree of laser speckle in the RGB image signals. The RGB image signals are reflected by the mirror 92 and pass through the lens 93. The RGB image signals are then expanded in a space by the scanning illumination system 94 that operates in synchronization with the image signals. The RGB image signals are projected onto the screen 96 by the projection optical system 95 to form a full-color image.

Like the image projection apparatuses according to the above-described embodiments, in the image projection apparatus 81, by using the screen 96 according to the above-described embodiment, the degree of speckle can be reliably reduced with a relatively simple and practical structure of the screen 96.

It should be noted that, in this image projection apparatus that projects light of an image using the diffractive light modulation element, the arrangement of the optical components except for the screen described in the foregoing embodiments can be modified in a variety of ways.

As noted above, according to the present embodiment, the degree of scintillation and speckle occurring in the image projection apparatus can be reduced. In particular, speckle noise caused by a light source having a high coherency, such as a laser, can be reliably reduced through a relatively simplified and useful structure.

In addition, according to the present embodiment, since the diffuser plate of the screen is supported by a securing member via connecting members using the elastic members, the diffuser plate can smoothly move through a simplified structure.

Moreover, if leaf springs are used for the elastic members, the structure can be simplified at low cost.

Furthermore, if a VCM is used for the driving unit, an electromagnetic force is used for driving the diffuser plate. Accordingly, since the driven diffuser plate 6 is not in contact with the securing member 23, deflection or distortion of the screen is not generated even when the diffuser plate of the screen expands and contracts due to variation of the temperature. Consequently, the occurrence of an error during a driving operation can be advantageously reduced compared with a mechanical driving unit.

While the screen and the image projection apparatus according to the present invention has been described with reference to the foregoing embodiments, the present invention is not limited thereto.

It should be understood by those skilled in the art that, in terms of a material of an optical sheet other than the diffuser plate of the screen and a light source and an optical system of the image projection apparatus, various modifications, combinations, sub-combinations and alterations may occur depending on design requirements and other factors insofar as they are within the scope of the appended claims or the equivalents thereof.

What is claimed is:

1. A screen onto which modulated light emitted from a light source is projected, the screen comprising:
    a securing member;
    a diffuser plate supported by the securing member using a plurality of elastic members, the plurality of elastic members being disposed so that the diffuser plate is resiliently displaced in two directions in a plane of the diffuser plate, wherein the plurality of elastic members include at least two leaf springs and wherein at least one of the at least two leaf springs is disposed so that a length direction thereof is directed along one of the two directions, and at least one other of the at least two leaf springs is disposed so that a length direction thereof is directed along the other of the two directions, and width directions of the at least two leaf springs are directed along an optical axis of the modulated light emitted from the light source; and
    first and second voice coil motors that move the diffuser plate with respect to the securing member in the two directions in the plane of the diffuser plate, wherein a sine-wave voltage applied to the first voice coil motor has a ninety degree phase difference with respect to a sine-wave voltage applied to the second voice coil motor, each of the first and second voice coil motors comprising a magnet secured to the securing member, a yoke secured to the securing member, and a coil secured to the diffuser plate.

2. The screen according to claim 1, wherein the diffuser plate is indirectly supported by the securing member using a connecting member disposed between the plurality of elastic members.

3. The screen according to claim 1, wherein the two directions represent a horizontal direction and a vertical direction of the screen.

4. An image projection apparatus comprising:
    a light source for emitting light;
    a screen including a securing member, a diffuser plate, and first and second voice coil motors; and
    a light modulation unit configured to modulate the light emitted from the light source and project the light onto the screen so as to display an image,
    wherein the diffuser plate is supported by the securing member using a plurality of elastic members, the plurality of elastic members are disposed so that the diffuser plate is resiliently displaced in two directions in a plane of the diffuser plate, the plurality of elastic members include at least two leaf springs, wherein at least one of the at least two leaf springs is disposed so that a length direction thereof is directed along one of the two directions, and at least one other of the at least two leaf springs is disposed so that a length direction thereof is directed along the other of the two directions, and width directions of the at least two leaf springs are directed along an optical axis of the modulated light emitted from the light source, the first and second voice coil motors move the diffuser plate with respect to the securing member in the two directions in the plane of the diffuser plate, and wherein a sine-wave voltage applied to the first voice coil motor has a ninety degree phase difference with respect to a sine-wave voltage applied to the second voice coil motor, each of the first and second voice coil motors comprising a magnet secured to the securing member, a yoke secured to the securing member, and a coil secured to the diffuser plate.

5. The screen according to claim 1, wherein the first voice coil motor moves the diffuser plate in one of the two directions and the second voice coil motor moves the diffuser plate in the other of the two directions.

* * * * *